(12) United States Patent
Buch et al.

(10) Patent No.: US 7,506,369 B2
(45) Date of Patent: Mar. 17, 2009

(54) SECURE FEDERATION OF DATA COMMUNICATIONS NETWORKS

(75) Inventors: Jeremy Buch, Redmond, WA (US); Gur Kimchi, Bellevue, WA (US); Srikanth Shoroff, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/856,259

(22) Filed: May 27, 2004

(65) Prior Publication Data

US 2005/0265327 A1    Dec. 1, 2005

(51) Int. Cl.
*G06F 11/30* (2006.01)
(52) U.S. Cl. .................................. 726/12; 709/225
(58) Field of Classification Search .............. 726/12
See application file for complete search history.

(56) References Cited

U.S. PATENT DOCUMENTS

| | | | | |
|---|---|---|---|---|
| 6,850,979 | B1 * | 2/2005 | Saulpaugh et al. | 709/225 |
| 7,274,783 | B2 * | 9/2007 | Yoakum et al. | 379/219 |
| 7,313,131 | B2 * | 12/2007 | O'Connor et al. | 370/352 |
| 7,424,006 | B1 * | 9/2008 | Schlesener et al. | 370/352 |
| 2002/0103850 | A1 * | 8/2002 | Moyer et al. | 709/202 |
| 2002/0116637 | A1 * | 8/2002 | Deitsch et al. | 713/201 |
| 2003/0046391 | A1 | 3/2003 | Jahanshah et al. | |
| 2004/0121760 | A1 * | 6/2004 | Westman et al. | 455/411 |
| 2004/0128542 | A1 * | 7/2004 | Blakley et al. | 713/201 |
| 2004/0193700 | A1 * | 9/2004 | Westman et al. | 709/219 |
| 2006/0020707 | A1 * | 1/2006 | Undery et al. | 709/230 |
| 2006/0031536 | A1 * | 2/2006 | Eydelman et al. | 709/228 |
| 2006/0209900 | A1 * | 9/2006 | Sekaran et al. | 370/503 |
| 2006/0233140 | A1 * | 10/2006 | Grimminger et al. | 370/338 |

FOREIGN PATENT DOCUMENTS

| | | |
|---|---|---|
| EP | 1 251 670 | 10/2002 |
| WO | WO03/079167 | 9/2003 |

OTHER PUBLICATIONS

Harroud, Hamid et al., "SIP-Based Agent Architecture for Collaborative Applications," Copyright 2003 IEEE (4 pages).
Berger, Stefan et al., "Ubiquitous Computing Using SIP," NOSSDAV '03 Jun. 1-3, 2003, Nonterey, California, Copyright 2003 ACM (9 pages).
Moyer, Stan et al., "A Protocol for Wide-Area Secure Networked Appliance Communication," IEEE Communications Magazine, Oct. 2001 (10 pages).
Tsang S. et al., "Accessing Networked Appliances Using the Session Initiation Protocol," Copyright 2001 Telcordia Technologies, Inc. (8 pages).
European Search Report for EP Application No. 05103906.3, Sep. 30, 2005 (3 pages).

* cited by examiner

*Primary Examiner*—Kambiz Zand
*Assistant Examiner*—Yonas Bayou
(74) *Attorney, Agent, or Firm*—Perkins Coie LLP (57) ABSTRACT

Techniques for secure federation of data communications networks are provided. The techniques employ an edge proxy server to route messages depending on a federation mode. In Direct federation mode, an edge proxy server of a network is configured to exchange messages with a specified set of entities, such as other networks, servers, other devices, or users. In Automatic federation mode, an edge proxy server may accept all incoming messages from entities that have a valid certificate. In Clearinghouse federation mode, the edge proxy server forwards all outgoing messages to a specified, trusted clearinghouse server.

36 Claims, 4 Drawing Sheets

SECURE FEDERATION OF DATA COMMUNICATIONS NETWORKS

TECHNICAL FIELD

The described technology relates generally to data communications networks and, more particularly, to secure federation of data communications networks.

BACKGROUND

Applications sometimes need to establish and manage a session between computing devices. A session is a set of interactions between computing devices that occurs over a period of time. As an example, real-time communications applications such as MICROSOFT MESSENGER or Voice over Internet Protocol ("VoIP") establish sessions between communicating devices on behalf of users. These applications may use various mechanisms to establish sessions, such as a "Session Initiation Protocol" ("SIP"). SIP is an application-layer control protocol that devices can use to discover one another and to establish, modify, and terminate sessions between devices. SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>. A specification for locating SIP servers, "RFC 3263," is available at <http://www.ietf.org/rfc/rfc3263.txt>. All three of these specifications are incorporated herein in their entirety by reference.

Applications may use SIP with another protocol to send or receive information. As an example, an application may use SIP with Real-time Transport Protocol ("RTP") for transporting real-time data during a session. By using SIP with other protocols, applications can create and manage a session and exchange information during the session. The protocol used with SIP to exchange information may segment the information into messages. As an example, a VoIP application may segment a long narration into shorter messages. Exchanging messages during a session is referred to as a "dialog." SIP may use lower-level communications layers to transport a dialog's messages, such as Transmission Control Protocol/Internet Protocol ("TCP/IP"), which are commonly employed transport- and network-layer protocols.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client, which is generally a device that initiates SIP requests (e.g., to initiate a session), or a user agent server, which is a device that generally receives SIP requests and responds to such requests. As examples, "IP-telephones," personal digital assistants, and any other type of computing device may be user agents. A device can be a user agent client in one dialog and a user agent server in another, or may change roles during the dialog. A proxy server is an entity that acts as a server to clients and a client to servers. In so doing, proxy servers intercept, interpret, or forward messages between clients and servers. Proxy servers contribute to network security by, e.g., validating senders and recipients of messages. A redirect server accepts a SIP request and generates a SIP response directing the client that sent the request to contact an alternate network resource. As an example, a redirect server may indicate at which of several devices a particular user is presently available. A registrar is a server that accepts registration information from SIP clients and informs a location service or other entities of the received registration information.

SIP supports two message types: requests, which are sent from a client to a server, and responses, which are sent from a server to a client, generally when responding to a request. A SIP message comprises three parts. The first part of a SIP message is a "start line," which includes fields indicating a message type and a protocol version. The second part of a SIP message comprises header fields whose values are represented as name-value pairs. The third part of a SIP message is the message's body, which is used to describe the session to be initiated or contain data relating to the session. Message bodies may appear in requests or responses.

SIP messages are routed based on the contents of their header fields. To be valid, a SIP request should contain at least the following six header fields: To, From, CSeq, Call-ID, Max-Forwards, and Via. The To header field indicates the logical identity of the recipient of the request. The From header field indicates the logical identity of the initiator of the request. The Max-Forwards header field indicates the number of hops a request can make before arriving at its destination. As an example, if a message from device A transits device B before arriving at destination device C, the message is said to have made two hops (e.g., devices B and C). The Via header field indicates the path taken by the request so far (e.g., a sequence of network addresses of devices through which the request has transited) and indicates the path that should be followed when routing the response. A header may also contain Record-Route fields that are used to indicate that future requests and responses should be routed through an indicated device. Network devices may insert Record-Route header fields specifying devices when forwarding a SIP message in an attempt to force subsequent messages in a dialog to be routed through the specified devices. The Record-Route header field may contain an identifier (e.g., network address) for the device and parameters. These and other header fields are described in the SIP specifications referenced above.

Several organizations may each offer SIP servers as a network resource. These organizations may enable SIP clients and servers from outside their networks, e.g., from the Internet or other organizations, to connect to their SIP servers to exchange messages. An organization may acquire a certificate for its SIP server from a trusted entity to enable other organizations to authenticate messages its SIP server sends. The SIP server may add an indication of this certificate to messages it sends using a protocol such as Transport Layer Security ("TLS").

Organizations may wish to federate their SIP servers or networks. By federating their SIP servers or networks, organizations enable participants in their networks to communicate with SIP servers of other trusted organizations in the federation. As an example, an organization may desire to set up an application-level virtual private network ("VPN") to enable applications being executed by the organization to securely communicate with SIP servers that may be located in another organization's network. An effective approach to enable administrators of SIP servers to securely federate their SIP servers would have significant utility.

SUMMARY

Techniques for secure federation of data communications networks are provided. The techniques employ an edge proxy server to route messages depending on a federation mode. In Direct federation mode, an edge proxy server of a network is configured to exchange messages with a specified set of entities, such as other networks, servers, devices, or users. In Automatic federation mode, an edge proxy server may accept all incoming messages from entities that have a valid certificate. In Clearinghouse federation mode, the edge proxy server forwards all outgoing messages to a specified, trusted clearinghouse server.

DETAILED DESCRIPTION

In an embodiment, techniques for secure federation of data communications networks are provided. The techniques employ an edge proxy server to route messages depending on a federation mode. An edge proxy server is a network resource that straddles two networks (e.g., an intranet and the Internet or two intranets) such that a computing device "outside" the edge proxy server's network communicates with computing devices "inside" the edge proxy server's network through the edge proxy server and vice versa. The edge proxy server acts as an intermediary between computing devices on either side of the edge proxy server's network. In so doing, it intercepts, interprets, or forwards messages between entities such as clients and servers. An administrator may choose to federate a data communications network having an edge proxy server in one or more of several federation modes including Direct, Automatic, or Clearinghouse. The administrator may also choose to allow or deny access to computing devices inside the edge proxy's network by users of computing devices outside its network.

In Direct federation mode, an edge proxy server of a network is configured to exchange messages with a specified set of entities, such as other networks, servers, computing devices, or users. Administrators of networks may specify authorized entities, such as servers or domains, with which an edge proxy server is authorized to exchange messages. Administrators may specify these entities using uniform resource identifiers ("URIs"). As an example, an administrator may indicate to allow a partner ("PartnerA") for direct federation via its edge proxy server, "edge.partnera.com." and grant PartnerA responsibility and authorization only for the domain "partnera.com." This configuration authorizes "edge.partnera.com" to connect and send or receive messages for any user who has a URI that matches the pattern "<any user>@partnera.com". The edge proxy server may also authenticate computing devices outside its network using a variety of authentication models including, e.g., certificates, shared keys, privately exchanged public/private key pairs, Kerberos, or other credentials-based authentication. An administrator selecting the authentication model used by the edge proxy server may also indicate that no authentication other than using a domain name service ("DNS") is to be employed. This authentication may include determining whether a certificate received when a connection is established or appearing in a header field of an arriving message appears in a list of revoked certificates. When certificates are used, this list of revoked certificates may be updated from time to time either automatically or manually. Authenticating the authorized entity may also include determining whether the authorized entity sent the message on a valid (e.g., authenticated) connection. Once authentication and authorization checks are completed, the edge proxy server may ignore all messages from or to entities that are not authenticated or are not authorized. When a message arrives from an authorized entity (which may also be authenticated), the edge proxy server may check whether the entity that sent the message or is the recipient of the message appears in a "deny list." As an example, "X.COM" may be an authorized entity, but "JOE@X.COM" may be in the deny list. In such a case, a message from "SALLY@X.COM" would be accepted, but a message from "JOE@X.COM" would be ignored. The edge proxy server may then forward messages that are not ignored to an appropriate "next hop." The next hop is a computing device to which the message will be routed next. The edge proxy server determines the next hop for the message based on either contents of the message's header fields, by administrator configuration of next hops, or by querying another server, such as a registration server associated with the recipient of the message. Thus, in Direct federation mode, messages may be exchanged only with entities indicated to be authorized by the administrator and can be authenticated.

In Automatic federation mode, an edge proxy server may accept all incoming messages from entities that can authenticate themselves in a manner indicated as acceptable by an administrator of the edge proxy server. Edge proxy servers may authenticate computing devices outside their network using a variety of authentication models including, e.g., certificates, shared keys, privately exchanged public/private key pairs, Kerberos, or other credentials-based authentication. As an example, when an entity sends a message to the edge proxy server, the entity may authenticate itself with the edge proxy server by adding a certificate to all messages or providing a certificate relating to the connection. Upon receiving a message on an authenticated connection, the edge proxy server may choose to accept the message based on the certificate. Alternatively, messages may contain certificates that authenticate the messages on non-authenticated connections. The authentication may include validating the certificate by, e.g., determining whether the certificate indicated in the message appears in a list of revoked certificates, which could be an indication to invalidate the message or connection. This list of revoked certificates may be updated from time to time either automatically or manually. The edge proxy server may validate that the URI indicated for the sender of the message matches the domain that actually sent the message (as identified by the certificate used to authenticate the sending entity). When the edge proxy server receives an outgoing message from a computing device inside its network, it may use a query services ("SRV") mechanism of a DNS to discover what services the destination server offers. This mechanism is jointly referred to as "DNS-SRV." The edge proxy server may then request a secure session to the destination server using Mutually authenticated Transport Layer Security ("MTLS") if the destination server offers such a service. The Automatic federation mode may also have a deny list containing entities from which messages may be refused or to which messages may not be sent. Thus, in Automatic federation mode, the edge proxy server does not need to know about other networks or servers in the federation until a message is actually received or sent.

In Clearinghouse federation mode, the edge proxy server may forward all outgoing messages to a specified, trusted clearinghouse server. The clearinghouse server may forward messages it receives to the recipient specified in the message. In an embodiment, the clearinghouse server continues to route messages between computing devices connected in a session. In an embodiment, the recipient of the message may establish a session with the sender directly, bypassing the clearinghouse for subsequent messages in the session. By using a clearinghouse, the edge proxy server does not need to know about other networks or servers in the federation, and only needs to know about the trusted clearinghouse server. Networks or servers in a federation may implicitly trust all entities whose messages are forwarded by the clearinghouse. However, like Automatic and Direct federation modes, the Clearinghouse federation mode may also have a deny list containing entities from which messages will be refused. In Clearinghouse federation mode, the edge proxy can easily be configured to exchange messages with a large number of networks with minimal configuration through the use of a managed clearinghouse that facilitates this exchange of messages.

In an alternate embodiment of the Clearinghouse federation mode, the clearinghouse server may indicate to which domains it can forward messages. This indication may enable administrators to allow a subset of clearinghouse servers to forward messages to the administrators' edge proxy servers.

Multiple federation modes can be employed at the same time in various "hybrid" federation modes. As an example, Automatic federation can be employed even when several Direct federation mode partners are configured. Edge proxy servers may also authorize additional entities automatically by dynamically adding entities with which it interacts to an authorization list that an administrator can later refine to add or remove entries. The Clearinghouse federation mode may also be used with Direct federation mode. In this configuration, the edge proxy server may exchange messages directly with authorized entities and may employ a clearinghouse server to authenticate other entities. By specifying known entities and also enabling message exchanges with a larger set of entities, the system enables communications with a large set of entities without requiring a significant manual effort on the part of an administrator.

Figure 1:
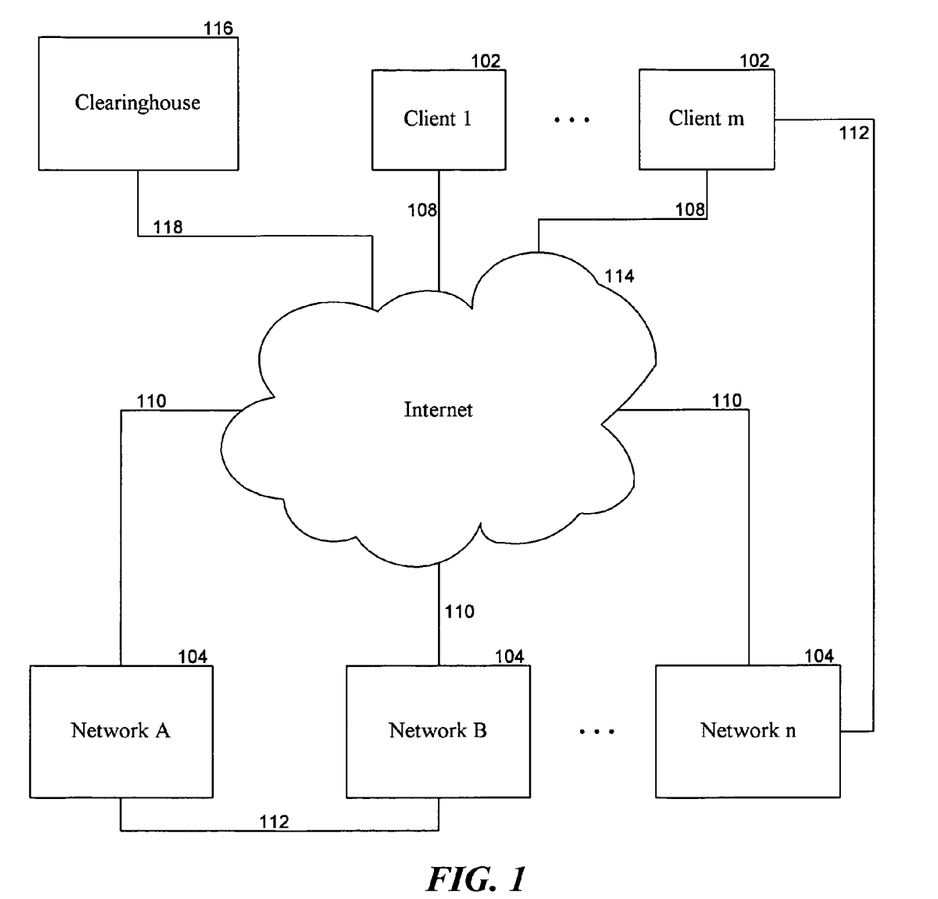
FIG. 1 is a block diagram illustrating an embodiment of a system for secure federation of data communications networks.

Turning now to the Figures, FIG. 1 is a block diagram illustrating an embodiment of a system for federating data communications networks securely. The system may have one or more clients 102, one or more networks 104, and a network to connect the clients and the networks 114, such as the Internet. The clients may be connected to the Internet via a network connection 108. The networks 104 may be connected to the Internet using various forms of data communications links 110. Clients may be, e.g., computers, cellular telephones, or other devices connected to the Internet. Networks may be, e.g., intranets. Clients may also be directly connected to networks using private data communications links 112. Similarly, networks may be directly connected to other networks using private data communications links 112. The system may also have a clearinghouse 116 connected to the Internet via a data communications link 118. The Internet may also be connected to various other computing devices (not shown). The connections described herein can be physical, wireless, and indeed any form of data communications network connection.

Figure 2:
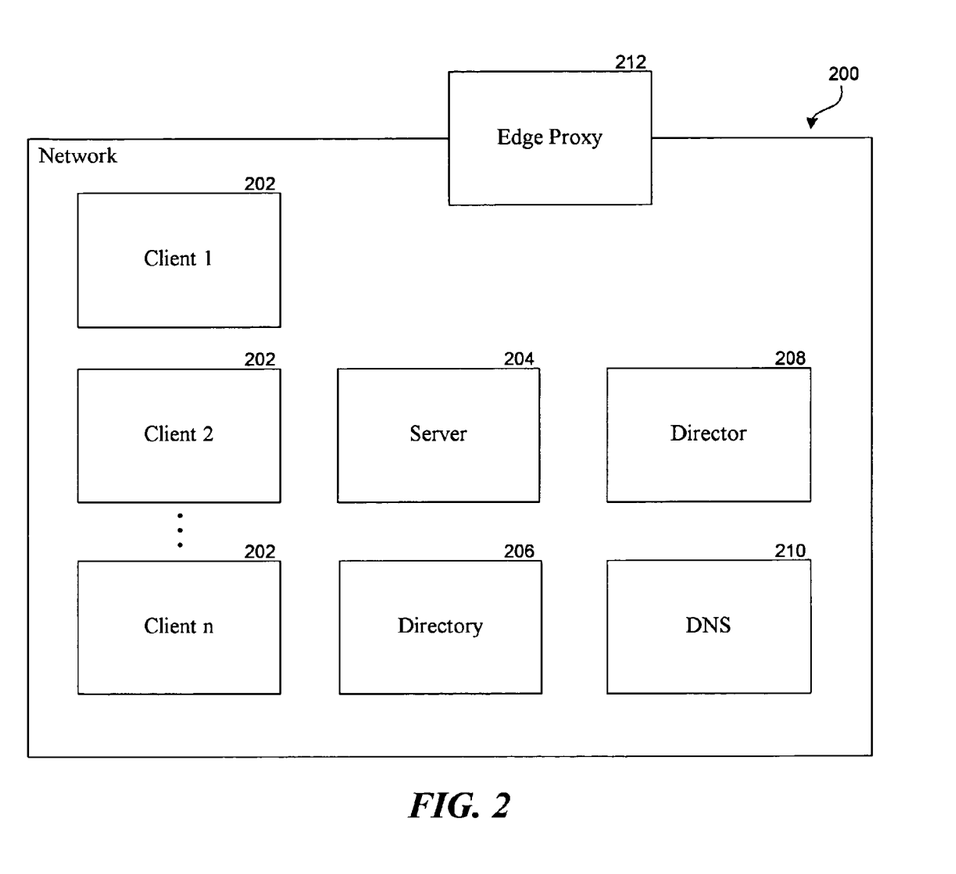
FIG. 2 is a block diagram illustrating an embodiment of a network of FIG. 1.

FIG. 2 is a block diagram illustrating an embodiment of a network of FIG. 1. The network 200 comprises one or more clients 202, a server 204, a directory server 206, director 208, DNS 210, and edge proxy server 212. The network may also comprise other devices (not shown). The illustrated devices of the network (and those not shown) may be interconnected via a data communications network associated with the network 200. The clients 202 and server 204 may perform various activities, including exchanging SIP messages. The directory service 206 may provide a location service for devices, users, and other network resources. As an example, the directory service may be an ACTIVE DIRECTORY service. The director 208 performs various server-related functions including, e.g., redirecting clients to a server or pool of servers with which the clients are associated, logging network traffic, and authenticating users connecting to the network from a computing device that is not a part of the network. The DNS has a database that maps network resource names (e.g., device names) to network locations (e.g., IP addresses). Devices of the network may use the DNS to resolve a "friendly" device name to a network address that the devices can use to route messages. An edge proxy server 212 is connected both to the network 200 ("inside" network) and an "outside" network, e.g., the Internet (not shown). When a client desires to open a session to a server, the edge proxy may, e.g., determine whether the session should be opened and which communications link should be used.

Figure 3:
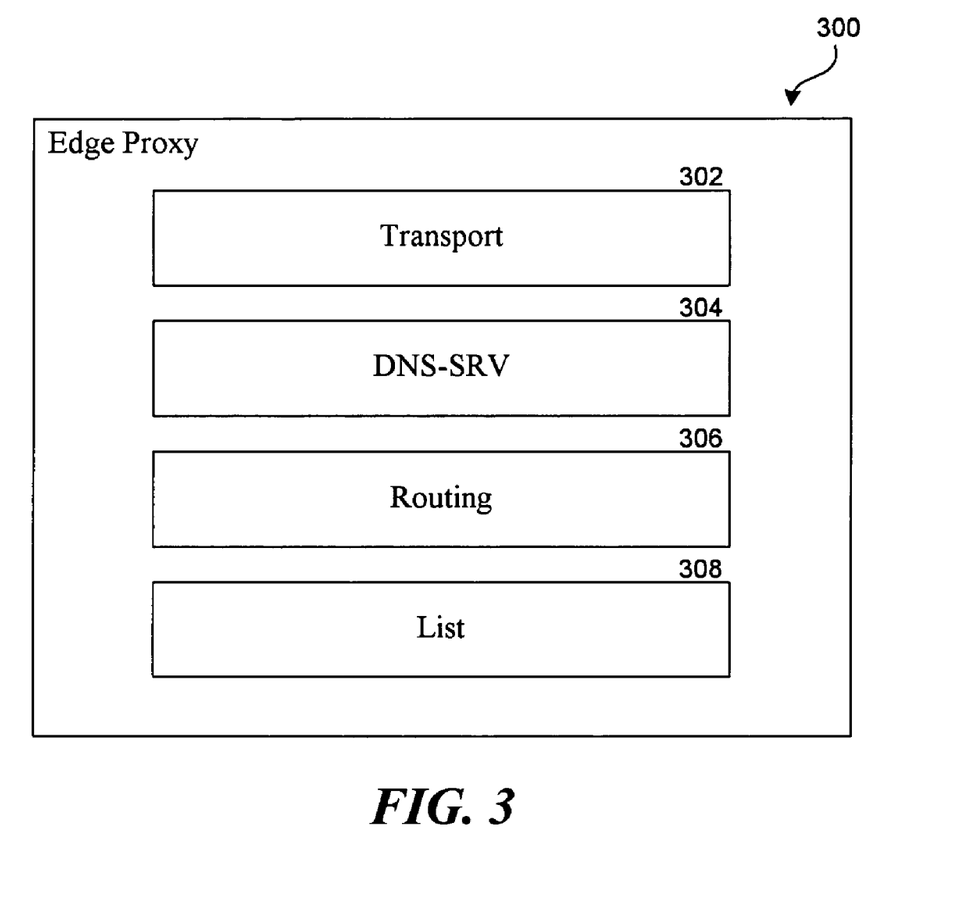
FIG. 3 is a block diagram illustrating an embodiment of an edge proxy server of FIG. 2.

FIG. 3 is a block diagram illustrating an embodiment of components relating to an edge proxy server of FIG. 2. The components comprise a transport component 302, DNS-SRV component 304, routing component 306, and list component 308. The edge proxy server receives incoming messages (i.e., messages arriving from the "outside" network) and forwards outgoing messages (i.e., messages going to the "outside" network). The edge proxy server forwards incoming or outgoing messages to a next hop (i.e., a device to which the message is routed next) after performing various operations relating to the message. These operations may include verifying whether the message was received from a server indicated in a message header field, determining whether the sender of the message is authorized to send the message to the edge proxy server's network, and determining to which device the message should be routed next. These operations are performed by or using various components of the network and edge proxy server, such as a transport component 302, routing component 306, domain name service query services component 306, and list component 308.

The transport component 302 establishes sessions with computing devices with which the edge proxy server exchanges messages. As an example, the transport component may establish an MTLS connection with a computing device sending a message into the network. The transport component may also control the number of sessions or connections it establishes with other computing devices in an effort to protect the edge proxy server from, e.g., "denial of service attacks," which are attempts by malicious users or devices to prevent the edge proxy server from carrying out its designated functions. The transport component may also verify that certificates appearing in messages from—or received when establishing a connection with—a device outside the network do not appear on a list of invalid certificates. The transport component may also add its own certificate to messages that the system forwards to devices outside the network or establishes connections with such devices.

The routing component 306 determines whether incoming messages and outgoing messages should be forwarded based on the contents of the messages' header fields. The routing component validates incoming messages by determining whether the URI of the sender of the message matches authentication information and other information contained in the header of the message. Whether the edge proxy server is operating in Direct, Automatic, or hybrid federation modes, the routing component determines whether the entity (or the entity's domain) of the sender or the recipient appears in a list of authorized entities or domains. When the edge proxy server is operating in Automatic federation mode (or a hybrid federation mode that includes Automatic federation mode), the routing component also determines whether the domain of the URI matches other information contained in the header of the message.

The routing component also validates outgoing messages based on contents of the messages' header fields. When operating in Direct federation mode, the routing mechanism determines whether the domain indicated for an outgoing message is authorized. If the domain is not authorized, the routing component ignores the message, or returns a responsive message indicating that the domain is unauthorized. When operating in Automatic federation mode, the routing component first checks to see whether the domain of the destination entity indicated in the message is authorized. If the domain is not authorized, the message may be passed to the DNS-SRV component to determine whether the message can be forwarded. The message may not be forwarded if the DNS-SRV component is unable to locate an appropriate entity to receive the message.

The domain name service query services component ("DNS-SRV") 304 determines destination servers for messages. This component may be employed for outgoing messages to determine how to route the messages. The DNS-SRV component may ignore messages or return responsive messages indicating a failure when the component is unable to determine to which server to route the message. An inability to locate an appropriate server to which to route the message may be an indication that the message is destined to an unauthorized server. The DNS-SRV component obtains a set of servers to which the message can be routed by querying a DNS server. The DNS-SRV component performs this query when requested by the transport component to indicate a server for a message based on, e.g., a URI. The transport component may then attempt to send the message to the indicated server. If the transport component is unable to contact the indicated server, the transport component may request the DNS-SRV component to provide an alternate server. This process may be repeated until the DNS-SRV component identifies a server the transport is able to contact. Alternatively, the DNS-SRV component provides a list of servers to the transport component, and the transport component iterates through the list independently until the transport component locates a server it can contact. The DNS-SRV component may not need to perform these steps when the edge proxy server is operating in Direct federation mode, because server addresses may be indicated explicitly.

The list component 308 may have associated lists of entities to or from which the edge proxy will exchange messages ("accept list"), and entities to or from which the edge proxy will not exchange messages ("deny list"). The lists may be stored in a storage device associated with or connected to the edge proxy server, such as a hard disk drive, random access memory, or a connected file server (not shown). In an embodiment, the system may consult the accept list (i.e., comprising authorized entities) before the deny list (i.e., comprising unauthorized entities). In an alternate embodiment, the system may check the lists in reverse order. Which list is checked first may have different consequences when an entity appears on both lists. As an example, if an entity appears on both lists and the deny list is checked first, messages from the entity may not be accepted even if the entity is subsequently added to the accept list.

A list may comprise entities specified using a variety of schemes that support searching. As examples, an administrator may be able to specify entities using fully qualified domain names, IP addresses, DNS-SRV queries, and other commonly employed means to indicate servers or domains. The information in the lists may be indicated using expressions. As an example, an administrator may indicate that all domains ending with "MICROSOFT.COM" are authorized. The list component may search for entities in the lists using a pattern searching mechanism. Such patterns may include wild cards. As an example, "*.MICROSOFT.COM" may be an indication that all messages to or from domains ending with "MICROSOFT.COM" are authorized.

A combination of authorized and unauthorized entities may be used to enable specific entities within a domain to send or receive messages. As an example, "*.x.com" may indicate that all domains ending in "x.com" are unauthorized, but "ceo.x.com" may be authorized. In such a case, all messages to or from any entity having a domain "x.com" would be ignored, except for messages to or from "ceo.x.com."

The system may use these components to determine whether and how to route outgoing messages in a variety of ways. The system may first determine whether the entity that will receive the message is in an authorized domain. If it is in an unauthorized domain, the system may determine whether the entity appears in a list of entities that have been authorized. As an example, the "X.COM" domain may be unauthorized, but the "CEO.X.COM" entity may be authorized. If the domain is not unauthorized (and not explicitly authorized), the system may contact a DNS to determine how to route the message. If there is no DNS entry for the recipient, the system may contact a clearinghouse to route the message. Alternatively, the system may send the message to a trusted party that may independently know how to route messages (e.g., a "default" route).

The edge proxy server may also enforce authorization logic relating to an enterprise's business model for routing messages. As an example, the edge proxy server may be configured to enable some users and devices to exchange SIP messages but not others. This authorization logic may use any and all of the federation modes to authorize and route messages. As a further example, the edge proxy server may first attempt Direct federation routing. If that fails, the edge proxy server may next attempt Automatic federation routing. If neither of those federation routing mechanisms enables the message to be forwarded, the edge proxy server may use the Clearinghouse federation model, in which the clearinghouse is indicated to be a "default" route.

Figure 4:
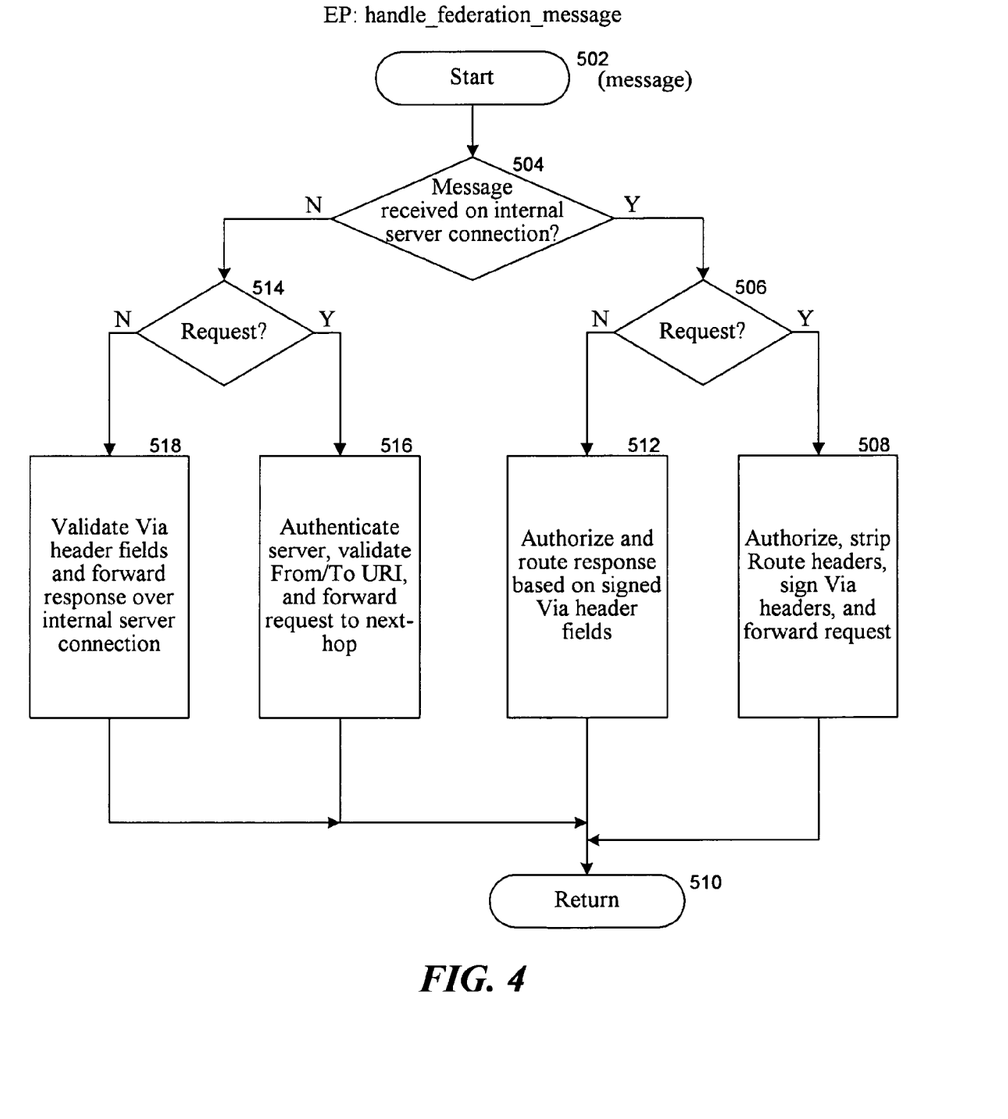
FIG. 4 is a flow diagram illustrating an embodiment of a routine performed by an edge proxy server for handling messages that are exchanged with devices on another federated network.

FIG. 4 is a flow diagram illustrating an embodiment of a routine performed by an edge proxy server for handling messages that are exchanged with devices on another federated network. As an example, the routine may authorize, authenticate, and forward messages relating to a session between two devices, each coupled to a different network. The routine begins at block 502, where it receives a message as a parameter. At block 504, the routine determines whether the message was received from an internal server. If the message was received from an internal server, the routine continues at block 506. Otherwise, the routine continues at block 514. At block 506, the routine determines whether the message is a request or a response. If the message is a request, the routine continues at block 508. Otherwise, the routine continues at block 512. At block 508, the routine determines whether the sender or recipient is authorized. If that is the case, the routine validates Route header fields from the message, signs Record-Route and Via header fields, and forwards the request. The Record-Route and Via header fields are signed so that devices can trust message headers in future messages they receive that use Route or Via headers for routing.

At block 512, the routine determines whether the sender or recipient indicated in the response are authorized. If that is the case, the routine routes the response based on the signed Via header fields of the response.

At block 514, the routine determines whether the message is a request or a response. If the message is a request, the routine continues at block 516. Otherwise, the routine continues at block 518. At block 516, the routine authenticates the server to which the request will be forwarded. If the server is authenticated, the routine validates the From and To URI header fields. If these header fields are valid, the routine forwards the message to the next hop.

At block 518, the routine validates the message's Via header fields. If these fields are valid, the routine forwards the response to the server.

The routine returns to its caller at block 510.

Although particular examples discussed herein refer to using SIP, alternate embodiments may use other equivalent or similar protocols.

The computing device on which the system for secure federation of data communications networks is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the system for secure federation of data communications networks may be implemented. The operating environment is only one example of a suitable operating environment and is not intended to suggest any limitation as to the scope of use or functionality of the system. Other well-known computing systems, environments, and configurations that may be suitable for use include personal computers, server computers, hand-held or laptop devices including "smart" cellular telephones, multiprocessor systems, microprocessor-based systems, programmable consumer electronics, network PCs, minicomputers, mainframe computers, distributed computing environments that include any of the above systems or devices, and the like.

The system for secure federation of data communications networks may be described in general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by an edge proxy server for federating a network in a direct federation mode, comprising:
   receiving an indication a list of authorized entities;
   receiving a message;
   verifying that the message was sent by an authorized and authenticated entity; and
   after verifying that the message was sent by an authorized and authenticated entity,
   determining a next hop for the message wherein the next hop identifies a computing device to which the message will be routed next; and
   forwarding the message to the next hop.

2. The method of claim 1 wherein the message is received using a session initiation protocol.

3. The method of claim 1 wherein the indication of authorized entities is a list.

4. The method of claim 3 wherein the list comprises entities designated by an administrator to be authorized.

5. The method of claim 3 wherein an entity is authorized when it does not appear on the list.

6. The method of claim 1 wherein the next hop is determined from a header field of the message.

7. The method of claim 1 wherein the next hop is determined by querying a server.

8. The method of claim 7 wherein the server is a domain name service.

9. The method of claim 1 wherein the next hop is determined from a list of authorized entities.

10. A method performed by an edge proxy server for federating a network in an automatic federation mode, comprising:
    receiving a message;
    verifying that the message was sent by an authenticated entity;
    determining whether a certificate indicated in a header field of the received message appears in a list of revoked certificates; and
    when the received message is an incoming message,
       verifying that a uniform resource identifier indicated for a sender of the message matches a domain from which the message was received; and
    when the received message is an outgoing message, querying a domain name service.

11. The method of claim 10 wherein the querying includes determining a next hop for the message.

12. An edge proxy server system for federating a network, comprising:
    a component that receives an indication of a federation mode for the proxy server;
    a component that receives a message;
    a component that authenticates a sender of the received message based on the indicated federation mode; and
    a component that handles the message based on the indicated federation mode and whether the sender of the received message is authenticated.

13. The system of claim 12 wherein the handling includes forwarding the message when a recipient indicated in the message does not appear in a deny list.

14. The system of claim 12 wherein the federation mode is direct.

15. The system of claim 14 wherein a sender is authenticated by determining whether the sender sent the message in a valid connection.

16. The system of claim 14 wherein the handling includes forwarding the message when a recipient indicated in the message appears in an accept list.

17. The system of claim 14 wherein the handling includes determining a next hop for the message.

18. The system of claim 12 wherein the federation mode is automatic.

19. The system of claim 18 wherein the sender is authenticated when the message was sent in a valid connection.

20. The system of claim 18 wherein the sender is authenticated when a domain of a URI indicated for the sender matches a domain of an entity that actually sent the message.

21. The system of claim 18 wherein the handling includes determining services offered by a destination entity indicated in the message.

22. The system of claim 21 wherein a service is mutually authenticated transport layer security.

23. The system of claim 12 wherein the federation mode is clearinghouse.

24. The system of claim 23 wherein the handling includes receiving messages from the clearinghouse.

25. The system of claim 24 wherein the sender is implicitly trusted.

26. The system of claim 23 wherein the handling includes forwarding outgoing messages to a clearinghouse.

27. The system of claim 23 wherein the handling includes establishing a session directly with the sender.

28. The system of claim 12 wherein the federation mode includes a combination of federation modes.

29. The system of claim 28 wherein the combination of federation modes includes a direct federation mode, an automatic federation mode, and a clearinghouse federation mode.

30. The system of claim 28 wherein the authentication includes receiving a certificate.

31. A computer-readable medium having computer-executable instructions for performing steps, comprising:
 receiving an indication of authorized entities;
 receiving a message;
 determining whether an entity that sent the message is authorized; and
 when the entity that sent the message is authorized,
  authenticating the authorized entity, wherein the authenticating includes determining whether the message was received on a valid connection; and
  when the authorized entity is authenticated,
   determining a next hop for the message wherein the next hop identifies a computing device to which the message will be routed next; and
   forwarding the message to the next hop.

32. The computer-readable medium of claim 31 including instructions for performing steps relating to determining whether the message was received from the authorized entity in a valid connection.

33. An edge proxy server for federating a network, comprising:
 means for establishing sessions with computing devices;
 means for authorizing the computing devices;
 means for validating messages from or to the computing devices;
 means for determining a destination for the validated messages; and
 means for routing the messages to the determined destination depending on a federation mode.

34. The edge proxy server of claim 33 wherein the means for establishing sessions with computing devices controls a number of sessions.

35. The edge proxy server of claim 33 wherein the means for authorizing computing devices may have an associated list of unauthorized entities.

36. The edge proxy server of claim 33 wherein the means for validating messages validates messages based on contents of the messages.

* * * * *